United States Patent
Watson et al.

(10) Patent No.: US 10,817,675 B2
(45) Date of Patent: *Oct. 27, 2020

(54) METHODS AND SYSTEMS FOR DISTRIBUTING INFORMATION ON TRANSPORTATION VEHICLES

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,519

(22) Filed: Nov. 20, 2018

(65) Prior Publication Data

US 2019/0087418 A1 Mar. 21, 2019

Related U.S. Application Data

(63) Continuation of application No. 15/350,865, filed on Nov. 14, 2016, now Pat. No. 10,169,338.

(51) Int. Cl.
 G06F 40/58 (2020.01)
 H04R 27/00 (2006.01)
 G09B 21/00 (2006.01)

(52) U.S. Cl.
 CPC .......... *G06F 40/58* (2020.01); *G09B 21/006* (2013.01); *G09B 21/009* (2013.01); *H04R 27/00* (2013.01);
 (Continued)

(58) Field of Classification Search
 CPC .. G09B 21/006; G09B 21/009; G09B 21/008; G06F 17/289; G06F 17/275;
 (Continued)

(56) References Cited

U.S. PATENT DOCUMENTS 5,896,129 A 4/1999 Murphy et al.
8,185,374 B2 5/2012 Kong et al.
(Continued)

OTHER PUBLICATIONS

"PaMic—Bluetooth PA system", http://play.google.com/store/apps.details?id=com.appiclife.pamic&hl=en, Aug. 31, 2014.
(Continued)

*Primary Examiner* — Angela A Armstrong
(74) *Attorney, Agent, or Firm* — Klein, O'Neill & Singh, LLP

(57) ABSTRACT

Methods and systems are provided for communicating an announcement to passengers on a transportation vehicle. For example, one method includes providing an information system on the vehicle having at least one of a wireless access point and a plurality of seat display devices and operating the information system to communicate with the wireless access point or the seat display devices. The method includes playing audio corresponding to the announcement over a public address system of the vehicle, and causing text corresponding to the audio to display on the seat display devices or personal electronic devices in communication with the wireless access point.

20 Claims, 8 Drawing Sheets

(52) U.S. Cl.
CPC .... *H04R 2227/003* (2013.01); *H04R 2420/07* (2013.01); *H04R 2499/13* (2013.01)

(58) Field of Classification Search
CPC .. G06F 17/5095; G06F 3/04842; G06F 9/454; G06F 40/58; H04W 4/00; H04W 4/14; H04W 4/40; H04W 4/48; H04W 68/005; H04W 84/12; G06Q 50/30; G10L 15/26; G10L 15/22; G10L 17/22; G10L 2015/221; H04L 12/189; H04L 51/38; H04L 67/306; H04R 2227/003; H04R 27/00; H04R 2420/07; H04R 2499/13; B60Q 1/26; G06K 9/00288; G06K 9/00838; H04N 21/43637; H04N 21/472
See application file for complete search history.

(56) References Cited

U.S. PATENT DOCUMENTS

| | | | |
|---|---|---|---|
| 9,439,205 B1* | 9/2016 | Lin | H04L 67/12 |
| 10,162,839 B1* | 12/2018 | Veitch | H04W 4/021 |
| 10,169,338 B2* | 1/2019 | Watson | G06F 17/289 |
| 2006/0167630 A1 | 7/2006 | Noma et al. | |
| 2006/0280338 A1* | 12/2006 | Rabb | G09B 21/006 382/114 |
| 2008/0108328 A1* | 5/2008 | Lovell | H04L 12/1859 455/412.1 |
| 2008/0219154 A1 | 9/2008 | Durrey et al. | |
| 2011/0246176 A1* | 10/2011 | Arasada | G06Q 10/06 704/3 |
| 2014/0236566 A1* | 8/2014 | Schreier | G06Q 10/105 704/2 |
| 2015/0227492 A1* | 8/2015 | Bai | G06F 17/248 715/762 |
| 2015/0248887 A1 | 9/2015 | Wlodkowski et al. | |
| 2016/0021047 A1* | 1/2016 | Sawato | H04L 51/20 455/456.3 |
| 2016/0372114 A1* | 12/2016 | Klose | H04M 15/751 |
| 2017/0043707 A1 | 2/2017 | Kirchner | |
| 2017/0313248 A1* | 11/2017 | Kothari | B60K 35/00 |
| 2018/0070291 A1* | 3/2018 | Breaux | H04W 76/14 |
| 2018/0074494 A1 | 3/2018 | Myers et al. | |

OTHER PUBLICATIONS

"School PA System", http://itunes.apple.com/us/app/school-pa-system/id553087145?mt=8, Apr. 20, 2016, INKids Education LLC.

Non-Final Office Action from USPTO dated Oct. 10, 2017 for related U.S. Appl. No. 15/350,865.

Final Office Action from USPTO dated Apr. 5, 2018 for related U.S. Appl. No. 15/350,865.

Notice of Allowance from USPTO dated Nov. 16, 2018 for related U.S. Appl. No. 15/350,865.

* cited by examiner

METHODS AND SYSTEMS FOR DISTRIBUTING INFORMATION ON TRANSPORTATION VEHICLES

CROSS-REFERENCE TO RELATED APPLICATIONS

This application is a continuation of U.S. application Ser. No. 15/350,865, filed on Nov. 14, 2016, now U.S. Pat. No. 10,169,338, entitled "METHODS AND SYSTEMS FOR DISTRIBUTING INFORMATION ON TRANSPORTATION VEHICLES," the disclosure of which is wholly incorporated herein by reference in its entirety and for all purposes.

TECHNICAL FIELD

The present disclosure relates to transportation vehicles in general, and more particularly, to distributing information on transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

In conventional flights, safety messages are often pre-recorded and played for passengers. This is a challenge for hearing impaired passengers because they may not be able to hear the audio. Airline crew member often have to personally check the hearing impaired passengers. Furthermore, when text messages are transmitted to passengers, one or more passenger may be visually impaired that may not be able to properly see a displayed message. Continuous efforts are being made to efficiently transmit messages on aircrafts and other transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
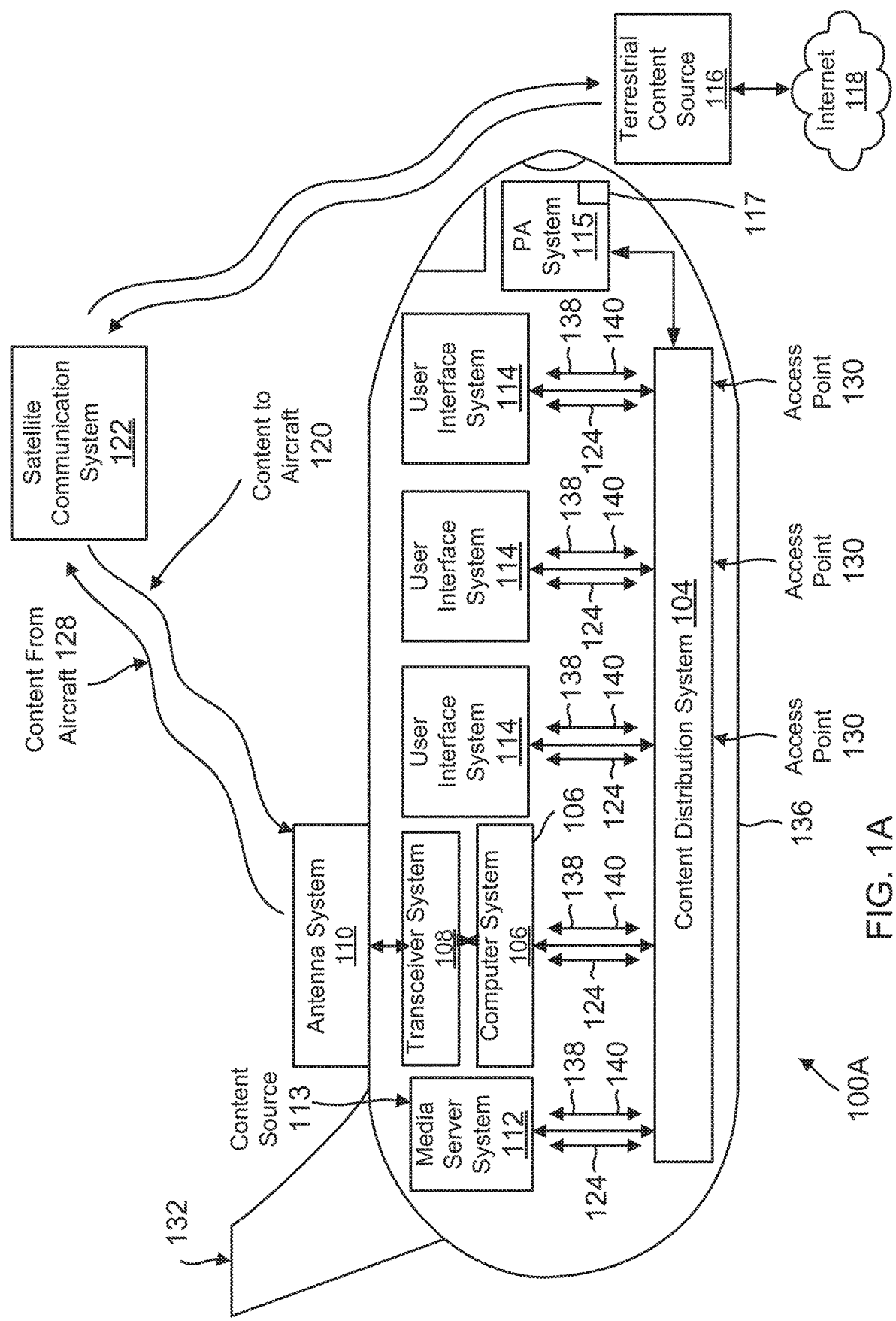
FIG. 1A shows an example of an operating environment for implementing the various aspects of the present disclosure on an aircraft.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, innovative computing technology is provided for presenting messages to passengers based on language preference and accommodate passenger impairments, for example, hearing and visual impairments. The technology enables conversion/translation of pre-recorded audio messages into text for hearing impaired passengers and presenting the converted/translated text in a language of choice on a PED, seat device or other display. The technology also enables conversion/translation of pre-defined text messages into audio in a language of choice for visually impaired passengers.

Methods and systems for a transportation vehicle are provided. For example, one method includes selecting pre-recorded audio for transmission to passengers on a transportation vehicle; determining by a processor a language preference for the passengers and if any passenger has any impairment; converting by the processor the pre-recorded audio into text in a first language for hearing impaired passengers; displaying the text by the processor in the first language on a personal electronic device, when there is no language preference; translating the text by the processor from the first language to a second language, based on the determined language preference; and displaying the text by the processor in the second language on the personal electronic device.

In another aspect, a method includes selecting text for transmission to passengers on a transportation vehicle; determining by a processor a language preference for the passengers and if any passenger has any impairment; displaying the text by the processor in a first language on a personal electronic device when there is no language preference; translating the text by the processor from the first language to a second language, based on the determined language preference; displaying the text by the processor in the second language on the personal electronic device; translating the text by the processor into audio in the first language for a visually impaired passenger; and presenting the audio to the visually impaired passenger by the processor in the first language.

Vehicle Information System: FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a personal electronic device (PED) to receive and view content via an access point 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, a microphone for voice input, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 1B:
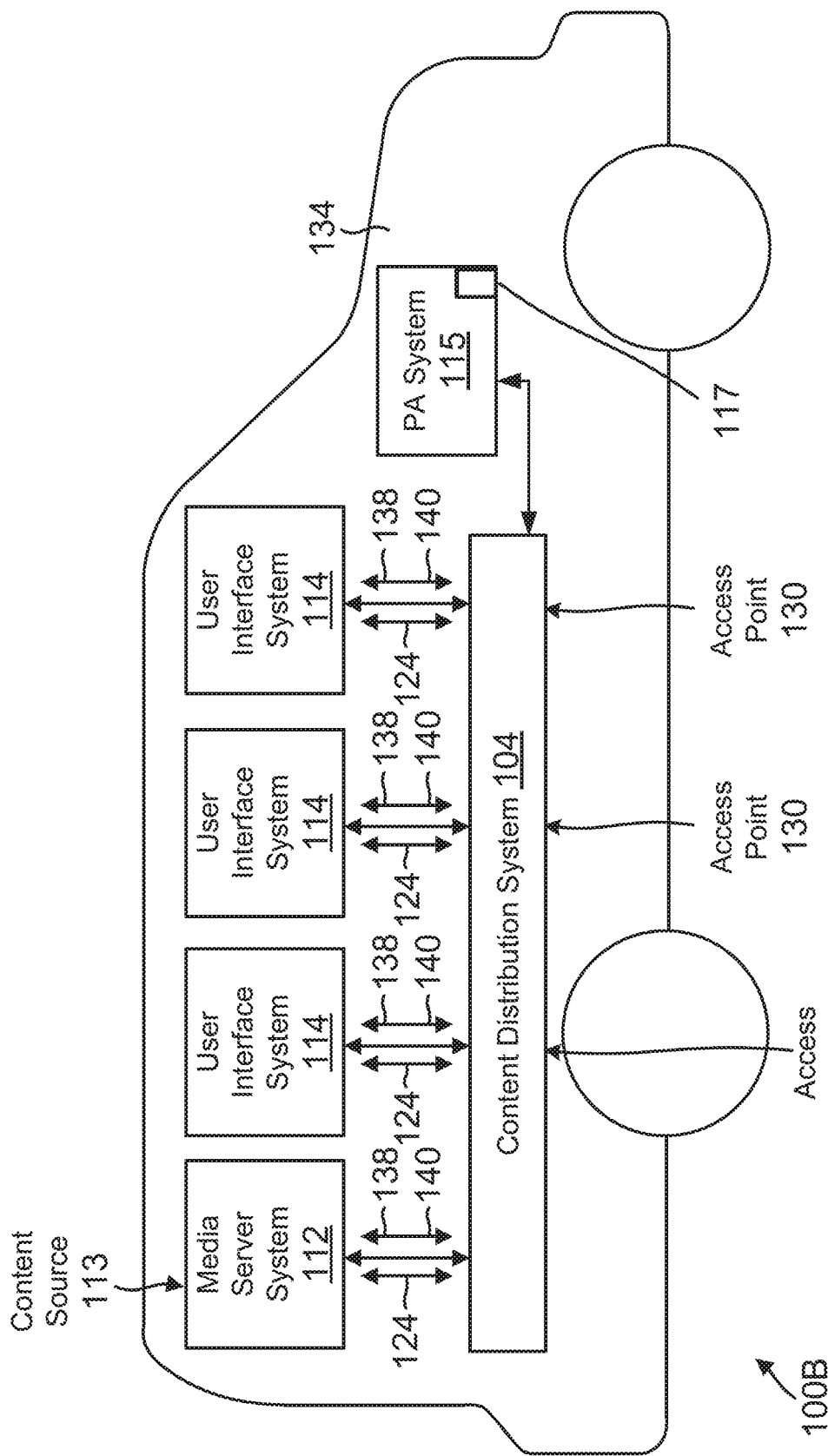
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
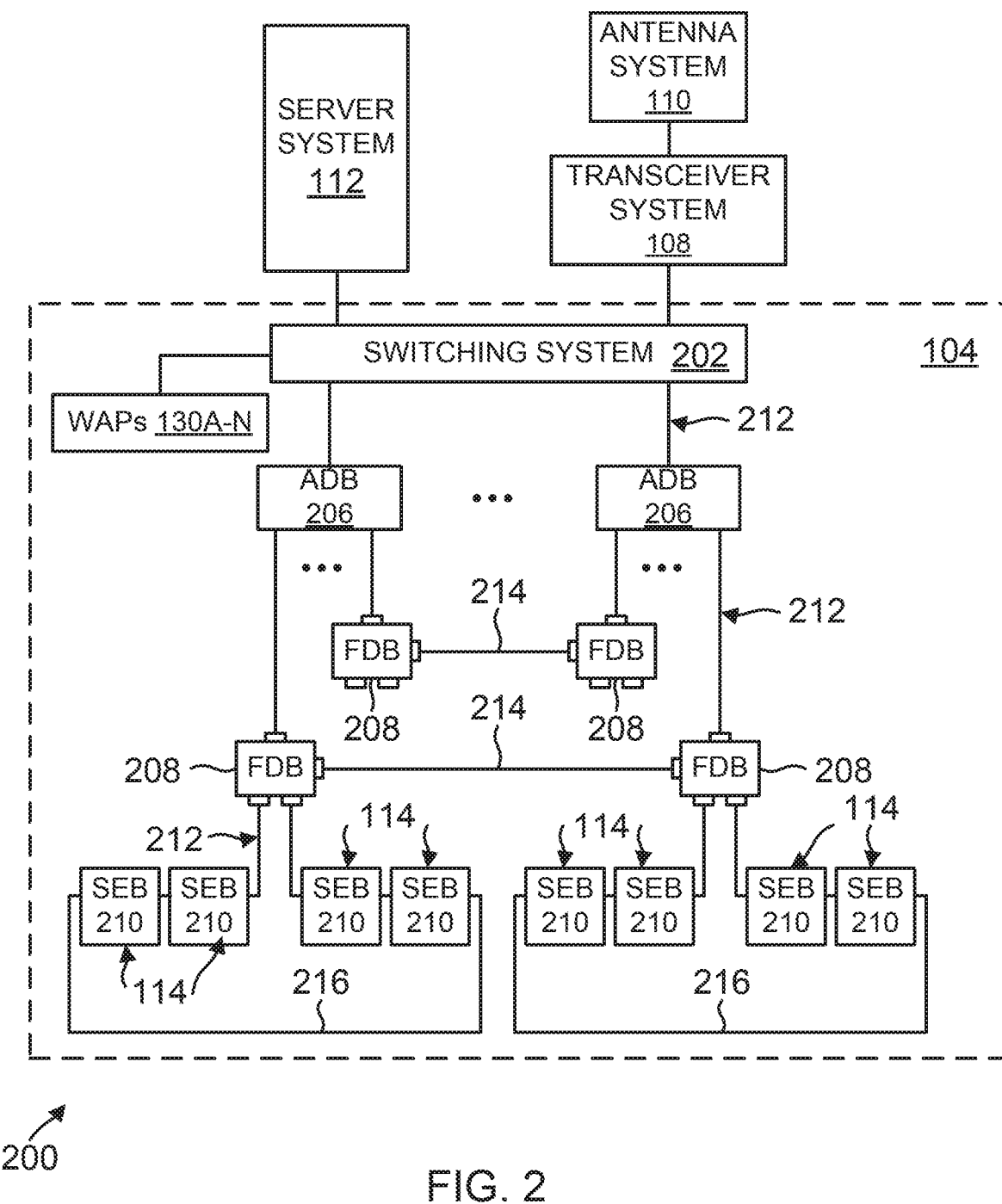
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
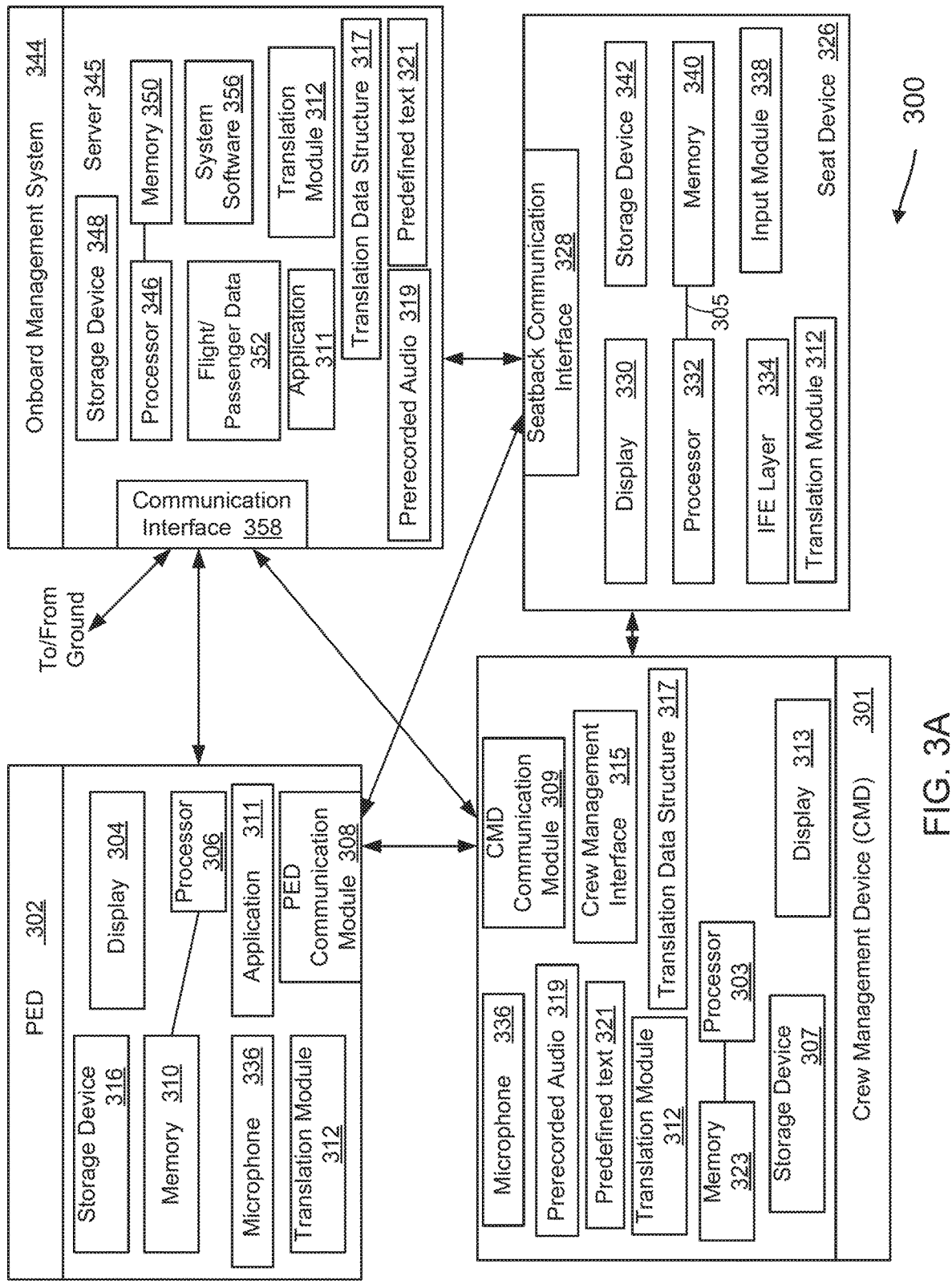
FIG. 3A shows an example of an overall system for distributing information to passengers on an aircraft, according to one aspect of the present disclosure.

System 300: FIG. 3A shows an example of a system 300 having a processor executed translation module 312 (may also be referred to as module 312) for converting and translating pre-recorded audio to text, for example, for hearing impaired passengers, according to one aspect of the present disclosure. Translation as used herein includes selecting text corresponding to the audio, i.e., the audio has been pre-translated or transcribed. In another aspect, module 312 converts text into audio for visually impaired passengers, as described below in more detail. Converting text as used herein, includes selecting audio corresponding to the text, i.e., the text has been pre-converted. In one aspect, a pre-recorded audio message after translation may be displayed on a PED 302. This is especially useful for aircraft that do not have a seat device 326.

Module 312 may be executed on an onboard management system 344 and/or on a crew management device (may be referred to as "CMD") 301. In one aspect, the onboard management system 344 may be similar to computer system 106 and/or server 112 described above with respect to FIGS. 1A/1B. In another aspect, module 312 may be executed on the PED 302, when a passenger is attempting to send a message to the crew.

As an example, module 312 retrieves pre-recorded audio 319 that is stored on a storage device (for example, 307). The audio is first converted into text and depending on the flight, may be translated into one or more languages by the translation module 312 using a translation data structure 317 described below in detail. The text is then displayed on PED 302.

In another aspect, the translation module 312 may also retrieve pre-defined text messages 321 and based on the flight, the text is translated into one or more languages and displayed on PED 302 (translation includes selecting text in another language corresponding to the pre-defined text message 321). For visually impaired passengers, the text is converted into audio and played on the PED 302 and/or the seat device 326.

In one aspect, CMD 301 may be a mobile phone, a notebook, a tablet, a laptop or any other similar device. CMD 301 may include a processor 303 that has access to a memory 323 via a bus system/interconnect (not shown) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 303 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

CMD 301 typically includes a microphone 336 for receiving a voice input, according to one aspect of the present disclosure.

In one aspect, CMD 301 includes a display 313 to display information. Display 313 may also include a touch screen for receiving input commands. Display 313 may also be used to receive messages from passengers.

The CMD 301 includes a storage device 307 that may be, or may include any storage medium for storing data in a non-volatile manner, such as one or more magnetic or optical based disks, flash memory, or solid-state drive. The storage device 316 may be used to store pre-recorded audio 319, pre-defined text 321, module 312, translation data structure 317 and a crew management interface (CMI) 315 that may be executed out of memory 323. The processes for using module 312 are described below in detail.

The CMI 315 enables the CMD 301 to interface with the onboard management system 344 via a CMD communication module 309. The CMD 301 may present one or more APIs (application programming interface(s)) to the management system 344 to retrieve passenger/flight data, the pre-recorded audio 319, pre-defined text 321, as well as translation data structure 317. The non-limiting API format and syntax will depend on the protocols used by the CMD 301 and the onboard management system 344.

In one aspect, the CMD communication module 309 is also used to communicate with the seat device 326, when installed, and one or more PEDs 302. In one aspect, the CMD communication module 309 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 309 for convenience, the communication module may have different interface, cards, logic and circuitry to comply with the different communication protocols/standards.

In one aspect, the onboard management system 344 includes a server 345 (similar to the media server 112 and/or computer system 106). The server 345 includes a processor 346 that has access to a memory 350 via a bus system/interconnect (not shown). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, pre-defined text 321, pre-recorded audio 319, passenger data 352, translation data structure 317 and other information) applications and program files, including system software 356, module 312, application 311, translation module 312 and others.

System software 356 of the onboard management system 344 is executed by the processor 346 to control the overall operation of the server 345 including monitoring the status of network connections to ground systems. Application 311 may be downloaded by passengers using an authorized PED 302 for accessing entertainment content or any other information.

In one aspect, the onboard management system 344 maintains flight and passenger data 352, for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, passenger impairment status (for example, visual impairment, hearing impairment and other impairment type) and any other information that can uniquely identify the passengers. Data 352 may be retrieved from an airline ground system (not shown) before flight departure and may be updated during flight.

In one aspect, server 345 communicates with CMD 301, PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect, PED 302 may be a mobile phone, a notebook, a tablet, a laptop or any other similar device. PED 302 may include a processor 306 that has access to a memory 310 via a bus system/interconnect (not shown) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 typically includes a microphone 336 for receiving a voice input, according to one aspect of the present disclosure.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302 when used by a passenger. In one aspect, display 304 may include a touch screen for receiving input commands. In another aspect, display 304 may be used to display text messages from crew members, as described below in detail.

The storage device 316 may also store an application 311 that may be executed out of memory 310. Application 311 may be used to pair the PED with the aircraft systems to receive content and communicate with aircraft crew. Application 311 may be used to store passenger language preference and impairment status. Application 311 may enable a pop-up window for displaying text for public announcements, as described below in detail. As shown in FIGS. 1A and 1B, the vehicle information system 100A or 100b includes a public address (PA) system 115 having at least one speaker 117, and typically several speakers along the passenger compartment, for audio announcements.

Returning to FIG. 3A, application 311 may be made available for download and installation on PEDs 302 via a public repository such as that maintained respectively under the trademark GOOGLE PLAY by Google, Inc. and/or the APP STORE maintained by Apple Inc. In addition, application 311 may be provided for download by an airline carrier on a website or from the onboard management system 344.

In one aspect, PED 302 uses a PED communication module 308 to communicate with the seat device 326, when installed on the onboard management system 344. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

Although the description below is based on sending messages to a passenger or passengers, the various aspects may be implemented for receiving messages from the passengers to a crew member on CMD 301. In that aspect, module 312 may be executed by the PED 302 for inputting a message to a crew member and translating the message into a language preferred by a crew member (translation is not required if the preferred language of the passenger and crew member are the same). In another aspect, module 312 is integrated with application 311. The module 312 as provided for non-crew passenger PEDs 302 may be limited to inputting a message to a crew member and translation thereof.

The module 312 may also be made available for download and installation on PEDs 302 via a public repository such as that maintained respectively under the trademark GOOGLE PLAY by Google, Inc. and/or the APP STORE maintained by Apple Inc. In addition, the module 312 may be provided for download by the carrier on a website or from the onboard management system 344. Alternatively, the module 312 may be loaded by the operator onto operator-owned PEDs 302 that it maintains and hands out to passengers.

In one aspect, the seat device 326 includes a display device 330, a processor 332, a memory 340, a communication interface 328 and a local storage device 342 for storing content. The seat device 326 receives user input/requests via an input module 338. The input module 338 may be configured to use a local touch screen included with display 330, a local virtual keyboard, an external mouse, external keyboard or any other input device. The various adaptive aspects described herein are not limited to any specific input device.

Processor 332 has access to memory 340 via an interconnect 305. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 336 executes an IFE layer 334 that provides in-flight entertainment and other options to users. The IFE layer 334 provides audio/video content as well as controls for accessing the content. The IFE layer 334 uses the communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

The seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the seat device 326 may be used by passengers for sending messages to a crew member at CMD 301. In that aspect, module 312 may be executed by the seat device 326 or integrated with the IFE layer 334 for inputting a message to a crew member and translating the message into a language preferred by a crew member (translation is not required if the preferred language of the passenger and crew member are the same). The module 312 as provided for seat device 326 may be limited to inputting a message to a crew member and translation thereof.

Figure 3B:
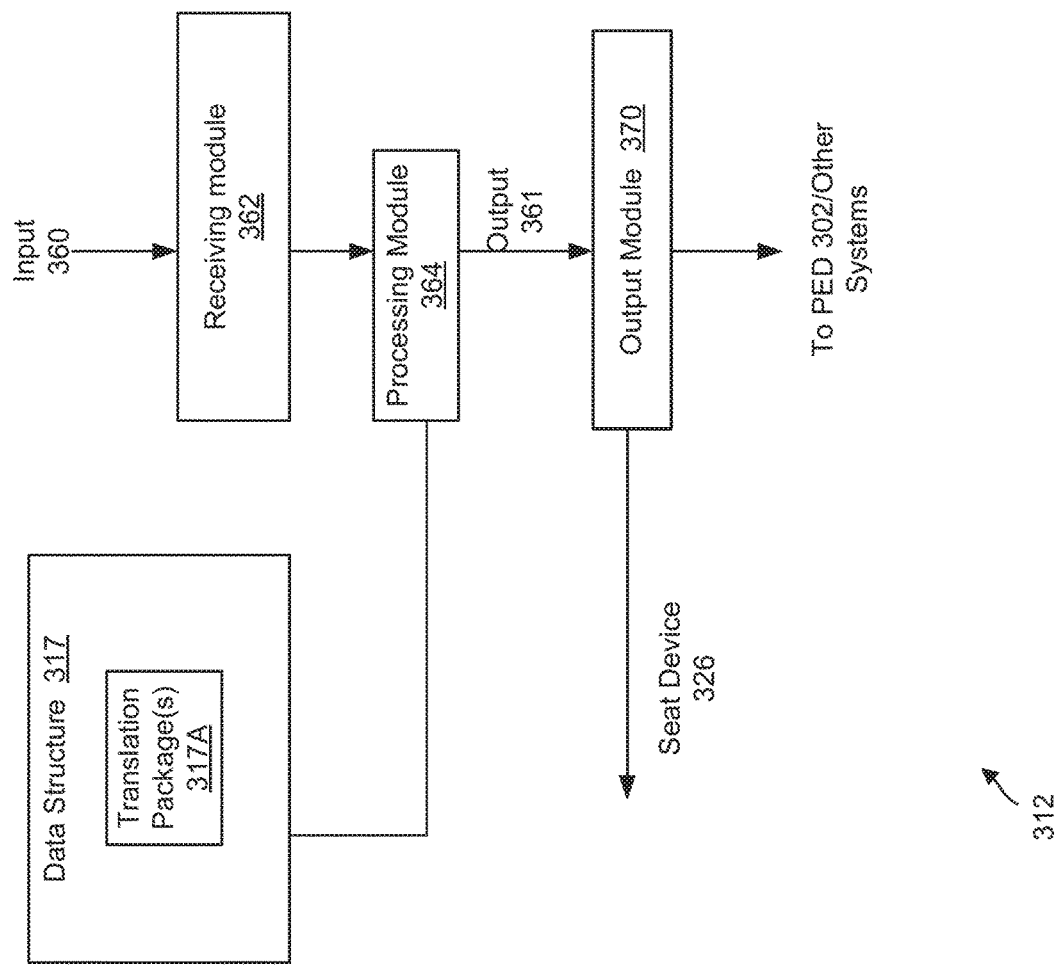
FIG. 3B shows a block diagram of a translation module used in the system of FIG. 3A, according to one aspect of the present disclosure.

Module 312: FIG. 3B shows a block diagram of the translation module 312, in one aspect of the present disclosure. In one aspect, module 312 may be executed by a CMD 301, server 345, PED 302, seat device 326 or any other authorized computing device on the aircraft. The description below of module 312 is based on an aircraft but the adaptive aspects of the present disclosure may be implemented on any transportation vehicle.

Module 312 includes a receiving module 362 that receives an input 360. The input may be based on pre-recorded audio 319 and/or pre-defined text 321. The input is provided to a processing module 364 that converts the audio into text or text into audio based on the input 360. The processing module 364 may also translate the converted input into one or more languages from a first language to one or more other languages. One or more translation package(s) 317A is used for translating audio/text from the first language to one or more languages. In one aspect, translation package(s) 317A are stored selectively based on the translation languages for a specific flight. The translation languages may be based on a flight itinerary (e.g., origin, destination and layovers) as well as on airline passenger preference defined by data 352. In one aspect, module 312 downloads translation package(s) 317A from a ground system (not shown) based on flight schedules/passenger data. This is efficient because then the aircraft only has to store what it needs for a specific flight. For pre-recorded audio 319 and/or pre-defined text 321, the translation packages 317A include pre-translated versions in each language such that conversion is performed by selecting the translation corresponding to the pre-recorded audio and/or pre-defined text.

In one aspect, the processing module 364 generates an output 361 that is provided to an output module 370 for transmission to PEDs 302 and/or seat devices 326. The output 361 may be text when audio is converted to text or the output may be audio, when text is converted to audio, as described below in detail. Alternatively, the output 361 causes an application on the PEDs 302 to select text or audio stored within the application for presentation on the PED.

Figure 4A:
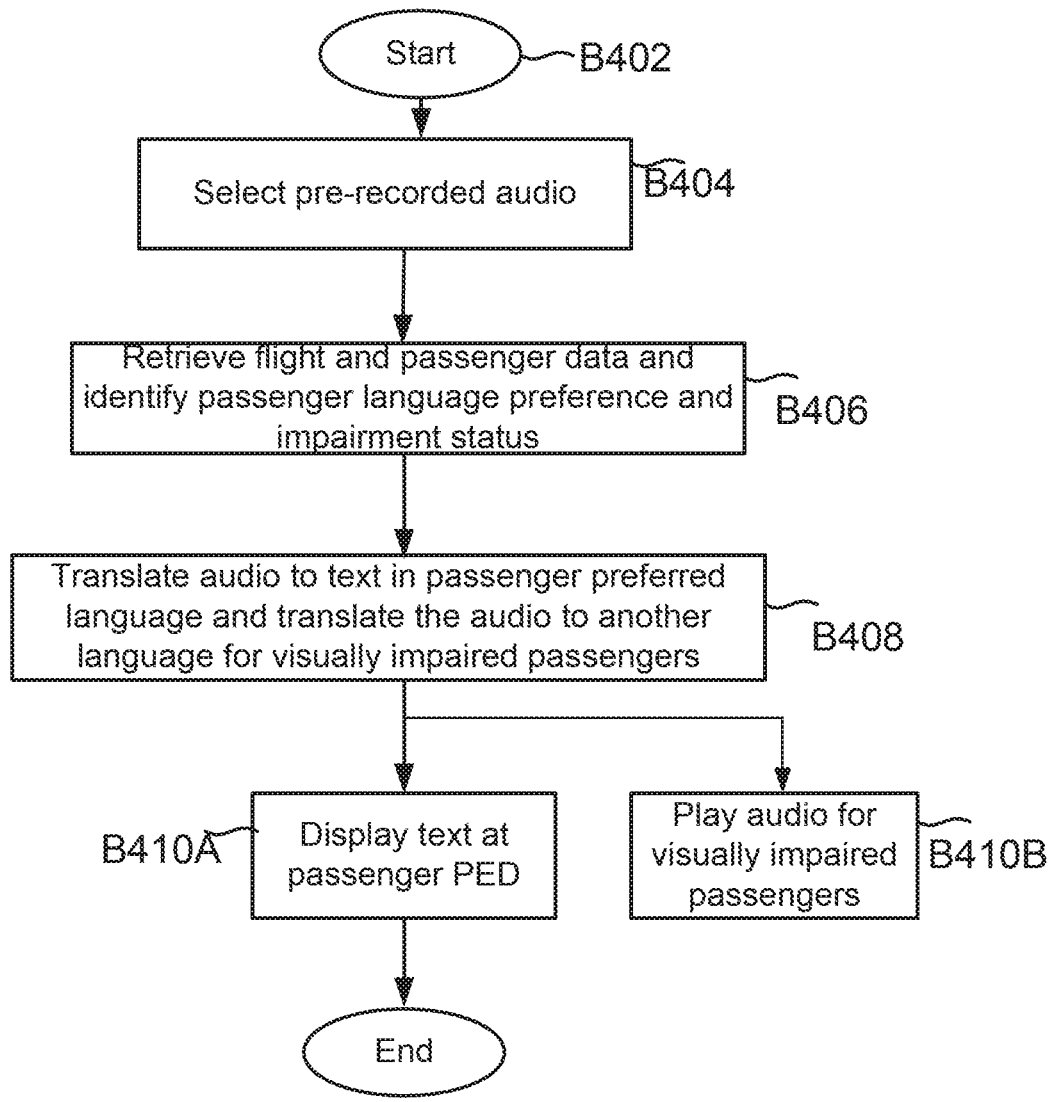
FIG. 4A shows a process flow diagram for distributing pre-recorded audio on a transportation vehicle, according to one aspect of the present disclosure.

Process Flow: FIG. 4A shows a process flow 400 for transmitting/distributing pre-recorded audio 319, according to one aspect of the present disclosure. Although the process is described with respect to an aircraft, the innovative technology described herein may be implemented on any transportation vehicle.

In one aspect, the process begins in block B402, when the pre-recorded audio 319 has been stored. The audio may be updated by an airline crew member. In one aspect, pre-recorded audio may include messages like, "fasten seat belt" and other messages. Translation data package(s) 317A is also initialized. The type of translation package may be based on a flight itinerary and/or based on passenger needs/preferences.

In block B404, a crew member using CMD 301 may select a specific message from the pre-recorded audio 319.

In block B406, flight and passenger data 352 is also obtained from an airline system (not shown) to determine translation needs and to identify passengers with hearing and visual impairments. Data 352 may also include information regarding the aircraft, including seat device information, overhead display device information, flight itinerary with flight origin location, layover and destination location information, seat layout for an aircraft and other information. Passenger data may include passenger name, seat numbers, a language preference, impairment information, if any, and other information. The flight information may also include airline preference for language translation for voice input. For example, for a specific flight an airline may request translation based only on origin/destination. In another instance, the airline may specify additional languages.

In block B408, the audio is first converted into text in a first language for at least hearing impaired passengers and/or for all non-visually impaired passengers. The first language may be a default language specified by the airline or may be based on the flight itinerary. The text may then be translated into one or more languages based on airline and/or passenger preferences as determined in block B406. In another aspect, the audio is translated into another language for visually impaired passengers, based on language preferences.

The translated text is displayed on passenger PED 302 in block B410A. In another aspect, the text is displayed on PED 302 and seat device 326, when seat device 326 is installed on the aircraft. If there is no translation, then the converted text is displayed in the first language on the PED 302 and/or the seat device 326.

In yet another aspect, the translated text may also be displayed on an overhead system (not shown). In that instance, the text is displayed in one or two languages based on space constraints. The languages may be based on flight itinerary and/or defined by the airline carrier.

For visually impaired passengers identified in block B406, the recorded message is played in block B410B on the PED 302 in the first language. In one aspect, the message is translated into another language and played in the other language.

Figure 4B:
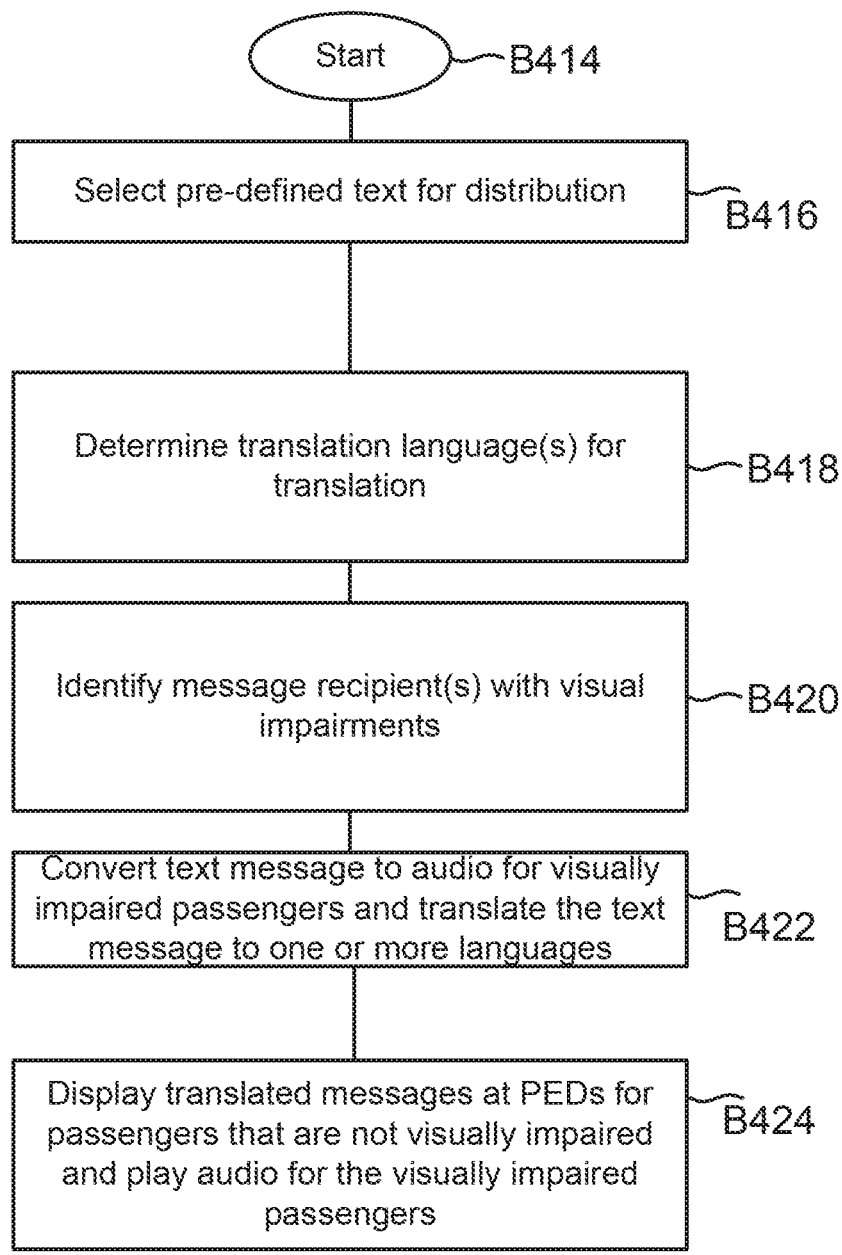
FIG. 4B shows a process flow diagram for transmitting text on a transportation vehicle, according to one aspect of the present disclosure.

FIG. 4B shows a process flow 412 for transmitting/distributing pre-defined text 321, according to one aspect of the present disclosure. In one aspect, the process begins in block B414, when the pre-defined text 321 has been stored. The pre-defined text may be updated by airline crew, for example, using CMD 301. Translation data package(s) 317A is initialized. The type of translation package may be based on a flight itinerary or based on passenger needs/preferences.

In block B416, a specific message from the pre-defined text is selected for distribution.

In block B418, module 312 determines translation languages if any for the selected text. This may be determined by retrieving flight and passenger data 352. The flight data may include information regarding the aircraft, including, seat device information, flight itinerary with flight origin location, layover and destination location information, seat layout for an aircraft and other information. Passenger data may include passenger name, impairment information (for example, visual impairment, hearing impairment and others), seat numbers, a language preference and other information. The flight information may also include airline preference for language translation. For example, for a specific flight an airline may request translation based only on origin/destination. In another instance, the airline may specify additional languages.

In block B420, message recipients that are visually impaired is determined. This information is obtained from passenger data 352.

In block B422, the translation module 312 converts the text message into audio in a first language for the visually impaired passengers. The converted message may also be translated from the first language into one or more languages based on passenger and/or airline preference. In another aspect, for non-visually impaired passengers, the select text message is also translated from the first language into one or more languages based on passenger and/or airline preference.

In block B424, the translated text messages are displayed on the PEDs 302, the seat devices 326 and/or overhead systems (not shown), while the audio is played for the visually impaired based on passenger preference. If there is no translation, then the original text message is displayed on the PEDs 302 and/or the seat devices 326 and the converted audio is played in the first language for visually impaired passengers. Thereafter, the process ends.

The technology disclosed herein enables transportation vehicle carriers (for example, airlines) to provide personalized and customized messages for passengers including passengers with hearing and visual impairments. This improves travel experience and is also effective for emergencies. For example, if an evacuation is ordered, passengers receiving messages in their language are more likely to follow procedures.

Figure 5:
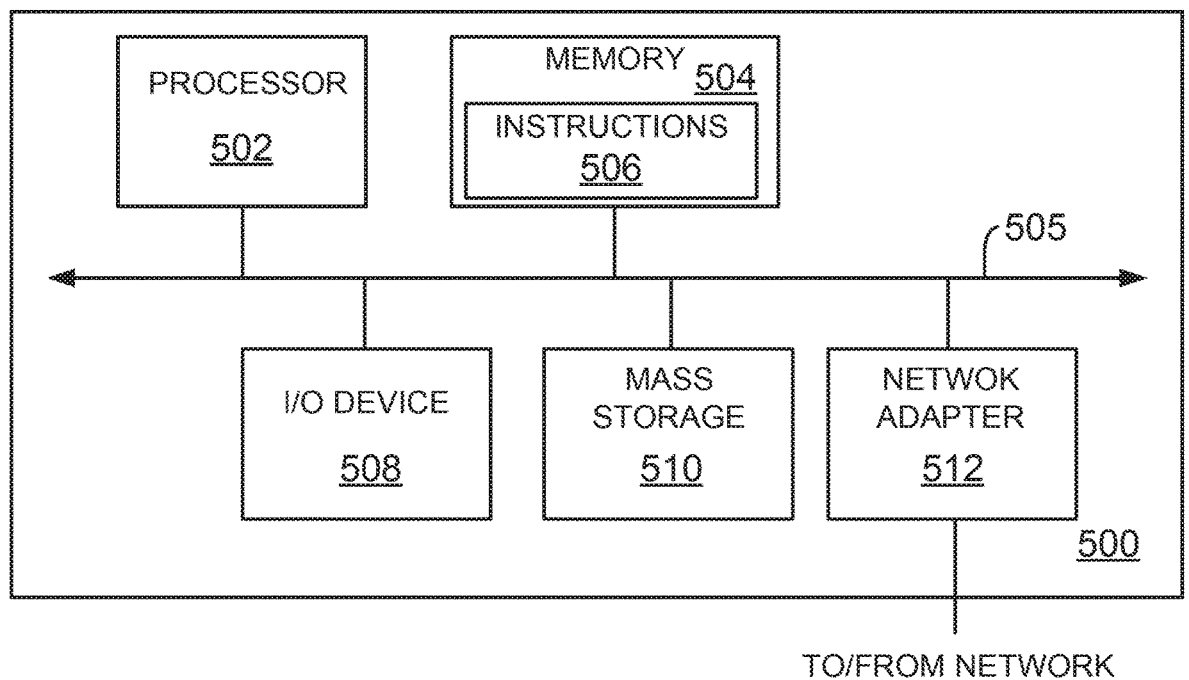
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent CMD 301, media server 112, computing system 106, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement CMI 315, module 312 and/or the process steps of FIGS. 4A-4B described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for transmitting messages on transportation vehicles have been described.

Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method for communicating an announcement to passengers on a transportation vehicle, the method comprising:
providing an information system on the vehicle in which the information system includes mounted in the vehicle at least one of a wireless access point and a plurality of seat display devices;
operating the information system to communicate with said at least one of a wireless access point and a plurality of seat display devices;
selecting text for transmission to passengers on the transportation vehicle corresponding to the announcement;
determining from a data structure maintained by the information system passengers that have a hearing or a visual impairment and a language preference, the passengers using a personal electronic device, a seat display device, or both the passenger electronic device and the seat display device;
if the information system includes a wireless access point, causing audio corresponding to the text to play for each passenger determined to have the visual impairment, and displaying the text for each passenger having the hearing impairment on a personal electronic device in a preferred language indicated by the data structure, the personal electronic device paired to a seat display device associated with each passenger having the hearing or visual impairment, and in communication with the wireless access point; and
if the information system includes a plurality of seat display devices as part of the information system, causing audio corresponding to the text to play in the preferred language as indicated by the data structure for each passenger determined to have the visual impairment, and displaying the text for each passenger having the hearing impairment on a seat display device associated with a passenger seat of each of the hearing or visually impaired passenger;
wherein the text is translated from a first language to the preferred language indicated by the data structure using a translation package stored by the information system, the translation package customized based travel itinerary of the transportation vehicle;
wherein audio corresponding to the text and displayed text is presented in the first language, when language preference for a passenger with the hearing or visual impairment is not indicated by the data structure.

2. The method of claim 1, wherein the first language is a default language used by the transportation vehicle, based on the travel itinerary.

3. The method of claim 2, wherein an impairment status and the language preference is stored at a passenger personal electronic device by an application executed by the passenger personal electronic device, and provided to the information system.

4. The method of claim 1, wherein a passenger enters the language preference.

5. The method of claim 1, wherein the translation package is stored at a storage device on the transportation vehicle, accessible by the information system.

6. The method of claim 1, wherein said selecting text for transmission is selected by a crew member of the transportation vehicle.

7. The method of claim 1, wherein the transportation vehicle is one or more of an aircraft, a train, a bus, a ship or a recreational vehicle.

8. A method, comprising:
selecting an announcement in a first language for transmission to passengers on an aircraft;
wherein one or more passenger electronic devices interface with an aircraft information system via a wireless access point, when provided on the aircraft;
wherein the aircraft information system communicates with a plurality of seat display devices, when provided on the aircraft;
identifying an impaired passenger from a data structure maintained by the aircraft information system;
converting the announcement to audio and translating the audio from the first language to a second language using a translation package available on the aircraft, when the selected announcement is text, the first language is not a preferred language for the impaired passenger and the impaired passenger is vision impaired as indicated by the data structure;
causing the translated audio to play on a personal electronic device of the vision impaired passenger paired to a seat display device of the vision impaired passenger for the aircraft information system having the wireless access point;
causing the translated audio to play at a seat display device of the vision impaired passenger for the aircraft information system having the plurality seat display devices;
causing the audio to play on at least one of the personal electronic device and the seat display device of the vision impaired passenger in the first language, when a language preference for the vision impaired passenger is not indicated by the data structure;
converting the announcement to text for the impaired passenger, upon identifying that the impaired passenger is hearing impaired and when the announcement is an audio message;
translating the text from the first language to the preferred language of the hearing impaired passenger using the translation package, when the first language is different from the preferred language; and
causing the translated text to display on a personal electronic device of the hearing impaired passenger, paired with a seat display device of the hearing impaired passenger for the aircraft information system having the wireless access point.

9. The method of claim 8, further comprising:
causing the translated text to display on a seat display device of the hearing impaired passenger for the aircraft information system having the plurality of seat display devices; and
causing the text to display on one of the seat display devices and the personal device of the hearing impaired passenger in the first language, when language preference is not specified for the hearing impaired passenger.

10. The method of claim 8, wherein an impairment status and language preference is stored at a passenger personal electronic device by an application executed by the passenger personal electronic device, and provided to the aircraft information system.

11. The method of claim 8, wherein the announcement is transmitted from a crew member device of the aircraft.

12. The method of claim 8, wherein the language preference is based on individual passenger preference.

13. The method of claim 8, wherein the first language is a default language on the aircraft based on an aircraft itinerary.

14. A non-transitory, machine readable storage medium having stored thereon instructions comprising machine executable code which when executed by a machine, causes the machine to:
- provide an information system on a transportation vehicle in which the information system includes mounted in the vehicle at least one of a wireless access point and a plurality of seat display devices;
- operate the information system to communicate with said at least one of a wireless access point and a plurality of seat display devices;
- select text for transmission to passengers on the transportation vehicle corresponding to an announcement;
- determine from a data structure maintained by the information system passengers that have a hearing or a visual impairment and a language preference, the passengers using a personal electronic device, a seat display device, or both the passenger electronic device and the seat display device;
- if the information system includes a wireless access point, cause audio corresponding to the text to play for each passenger determined to have the visual impairment, and display the text for each passenger having the hearing impairment on a personal electronic device in a preferred language indicated by the data structure, the personal electronic device paired to a seat display device associated with each passenger having the hearing or visual impairment, and in communication with the wireless access point; and
- if the information system includes a plurality of seat display devices as part of the information system, cause audio corresponding to the text to play in the preferred language as indicated by the data structure for each passenger determined to have the visual impairment, and display the text for each passenger having the hearing impairment on a seat display device associated with a passenger seat of each of the hearing or visually impaired passenger;
- wherein the text is translated from a first language to the preferred language indicated by the data structure using a translation package stored by the information system, the translation package customized based travel itinerary of the transportation vehicle;
- wherein audio corresponding to the text and displayed text is presented in the first language, when language preference for a passenger with the hearing or visual impairment is not indicated by the data structure.

15. The non-transitory storage medium of claim 14, wherein first language is a default language used by the transportation vehicle, based on the travel itinerary.

16. The non-transitory storage medium of claim 15, wherein an impairment status and the language preference is stored at a passenger personal electronic device by an application executed by the passenger personal electronic device, and provided to the information system.

17. The non-transitory storage medium of claim 15, wherein a passenger enters a language preference.

18. The non-transitory storage medium of claim 15, wherein the default language is based on an itinerary of the transportation vehicle.

19. The non-transitory storage medium of claim 14, wherein the text for transmission is selected by a crew member of the transportation vehicle.

20. The non-transitory storage medium of claim 14, wherein the transportation vehicle is one or more of an aircraft, a train, a bus, a ship or a recreational vehicle.

* * * * *